US009663400B2

(12) United States Patent
O'Malley et al.

(10) Patent No.: US 9,663,400 B2
(45) Date of Patent: May 30, 2017

(54) SCRATCH-RESISTANT LIQUID BASED COATINGS FOR GLASS

(71) Applicant: Corning Incorporated, Corning, NY (US)

(72) Inventors: Shawn Michael O'Malley, Horseheads, NY (US); Vitor Marino Schneider, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 107 days.

(21) Appl. No.: 14/074,766

(22) Filed: Nov. 8, 2013

(65) Prior Publication Data

US 2015/0132563 A1    May 14, 2015

(51) Int. Cl.
*C03C 17/25* (2006.01)
*C03C 17/00* (2006.01)
*B05D 3/02* (2006.01)
*C23C 18/12* (2006.01)
C23C 18/06 (2006.01)

(52) U.S. Cl.
CPC .......... *C03C 17/007* (2013.01); *B05D 3/0254* (2013.01); *C03C 17/25* (2013.01); *C03C 17/256* (2013.01); *C23C 18/127* (2013.01); *C23C 18/1216* (2013.01); *C23C 18/1245* (2013.01); *C23C 18/1254* (2013.01); *C23C 18/1283* (2013.01); *C03C 2217/22* (2013.01); *C03C 2217/425* (2013.01); *C03C 2217/45* (2013.01); *C03C 2217/475* (2013.01); *C03C 2217/76* (2013.01); *C03C 2217/78* (2013.01); *C03C 2218/113* (2013.01); *C03C 2218/32* (2013.01); *C23C 18/06* (2013.01); *Y10T 428/24997* (2015.04)

(58) Field of Classification Search
CPC ...... C03C 17/25; C03C 17/256; C03C 17/007
See application file for complete search history.

(56) References Cited

U.S. PATENT DOCUMENTS

| 3,032,388 | A |   | 5/1962 | McCord et al. |
| 4,256,463 | A |   | 3/1981 | Carter |
| 4,900,125 | A | * | 2/1990 | Iyer .................................. 385/70 |
| 4,960,618 | A | * | 10/1990 | Tanitsu et al. ................ 427/226 |
| 5,078,915 | A | * | 1/1992 | Sato et al. .................. 252/519.2 |
| 6,982,073 | B2 |   | 1/2006 | Sabacky et al. .............. 423/608 |

(Continued)

FOREIGN PATENT DOCUMENTS

| CN | 102166482 | 8/2011 |
| EP | 1403918 | 3/2004 |

(Continued)

OTHER PUBLICATIONS

Biswas "Sol-gel Thin Films for Optics and Photonics" J. Sol-Gel Sci. Technol (2011) 59:456-474.*

(Continued)

*Primary Examiner* — Nathan Empie

(57) ABSTRACT

A sol-gel method for forming durable, scratch-resistant coatings on glass substrates. Zirconia coatings, for example, are formed from a solution of zirconium oxychloride octahydrate in an organic, polar, aprotic solvent such as dimethylformamide. Annealed coatings, which optionally include an additive such as graphene, have a low coefficient of friction and can exhibit high hardness and hydrophobicity.

13 Claims, 11 Drawing Sheets

(56) References Cited

U.S. PATENT DOCUMENTS

| | | | | |
|---|---|---|---|---|
| 2007/0128905 | A1* | 6/2007 | Speakman | 439/161 |
| 2007/0184576 | A1* | 8/2007 | Chang et al. | 438/104 |
| 2008/0259262 | A1* | 10/2008 | Jones et al. | 349/139 |
| 2009/0169996 | A1* | 7/2009 | Zhamu | D01F 9/21 429/221 |
| 2009/0269667 | A1* | 10/2009 | Antonietti | C01B 31/02 429/231.4 |
| 2012/0049181 | A1* | 3/2012 | Kim et al. | 257/43 |
| 2013/0309613 | A1 | 11/2013 | O'Malley et al. | |
| 2013/0313301 | A1 | 11/2013 | Brown et al. | |

FOREIGN PATENT DOCUMENTS

| | | |
|---|---|---|
| WO | 03021004 | 3/2003 |
| WO | 2004068918 | 8/2004 |
| WO | 2014093265 | 6/2014 |

OTHER PUBLICATIONS

Pastoriza-Santos et al "Formation and Stabilization of Silver Nanoparticles Through Reduction by N,N-Dimethylformamide" Langmuir 1999, 15, 948-951.*

Shelby Introduction to Glass Science and Technology © The Royal Society of Chemistry 1997, p. 163-164, and 187-188.*

Nystedt "Corning develops nature-friendly glass for LCDs", Mar. 23, 2006 from: Macworld website: http://www.macworld.com/article/1050018/corning.html p. 1-2.*

S.G. Botta, et al., "Photocatalytic properties of $ZrO_2$ and $Fe/ZrO_2$ semiconductors prepared by a sol-gel technique", Journal of Photochemistry and Photobiology A: Chemistry, 1999, vol. 129, pp. 89-99.

Y. Chen, et al., "Characterization and Investigation of the Tribological Properties of Sol-Gel Zirconia Thin Films", Journal of American Ceramic Society, vol. 85, No. 9, 2002, pp. 2367-2369.

N.R.S. Farley, et al., "Sol-gel formation of ordered nanostructured doped ZnO films", Journal of Mater. Chem, 2004, vol. 14, pp. 1087-1092.

F. Namavar, et al., "Lotus Effect in Engineered Zirconia", Nano Letters, 2008, vol. 8, No. 4, pp. 988-996.

C. Wu, et al., "Gas-phase photo-oxidations of organic compounds over different forms of zirconia", Journal of Molecular Catalysis A: Chemical, 2005, vol. 229, pp. 233-239.

L. Yin, et al., "Preparation and photocatalytic activity of nanoporous zirconia electrospun fiber mats", Materials Letters, 2011, vol. 65, pp. 3131-3133.

PCT/US2014/063063 Invitation to Pay Additional Fees.

Anandan et al; Superhydrophilic Graphene-Loaded $TiO_2$ Thin Film for Self-Cleaning Applications; ACS Appl. Mater. Interfaces, 2013, 5, 207-212.

Huang et al; The Synthesis of Carbon nanotubes and zirconium carbide composite films on a glass substrate; Nanotechnology 15, (2004) 663-666.

Ciesielki et al., "Graphene via sonication assisted liquid-phase exfoliation", The Royal Society of Chemistry, DOI: 10.1039/c3cs60217f, Sep. 3, 2013.

Hernandez et al., "High-yield production of graphene by liquid-phase exfoliation of graphite", Nature Nanotechnology, vol. 3, pp. 563-568, Sep. 2008.

Zhou et al., "Production of Graphene by Liquid-Phase Exfoliation of Intercalated Graphite", International Journal of Electrochemical Science, vol. 9, pp. 810-820, 2014.

Li et al; "$LiNO_3$ Molten Salt Assisted Synthesis of Spherical Nano-Sized YSZ Powders in a Reverse Microemulsion System"; Materials Letters; 62 (2008) 1909-1912.

Shelby; "Mechanical Properties"; http://pubs.rsc.org; 2005 14 Pages.

* cited by examiner

SCRATCH-RESISTANT LIQUID BASED COATINGS FOR GLASS

BACKGROUND

Field

The present disclosure relates generally to methods for forming tribological thin films, and more specifically to a sol-gel route for forming durable, scratch-resistant coatings on glass substrates.

Technical Background

Scratches and other types of surface wear are a concern for glass cover applications such as in hand held devices, monitors and displays. Scratches increase the scattering of light and can reduce the brightness and contrast of images and text that is presented on such screens. Further, in the device-off state, scratches can make the display look hazy, marred and unattractive. In particular for displays and hand-held devices, scratch resistance can be an important attribute.

In particular, the formation of microductile scratches can be attenuated by adjusting the hardness of the surface that is being scratched. Microductile scratches shallow or narrow scratches characterized by a scratch depth or scratch width of less than 2 microns. Harder surfaces typically are more resistant to microductile scratching. While oxide glasses that form the glass substrates used in many glass covers typically have hardness values in the range of 6 to 9 GPa, the propensity of microductile scratch formation can be dramatically decreased by forming a hard, lubricious surface layer on the glass where the surface layer has a hardness value greater than 9 GPa.

It would be desirable to provide scratch-resistant coatings that can be applied to rigid glass covers that are economical, optically transparent and physically and chemically compatible with the underlying glass.

BRIEF SUMMARY

In accordance with embodiments of the present disclosure, a method for forming a coating on a glass substrate comprises providing a solution of a metal salt, organometallic compound or a combination thereof in a polar aprotic solvent, depositing the solution onto a glass substrate to form a coating on the substrate, and annealing the coating.

The method can be used to form amorphous or crystalline films of, for example, zirconium oxide (i.e., zirconia) or titanium oxide (e.g., titania) optionally including a nanoparticle (e.g., nanotube or nanowire) additive such as carbon nanotubes or graphene. An example precursor for the formation of zirconia coatings is zirconium oxychloride octahydrate.

The method involves relatively low temperature processing, which is compatible with roll-to-roll (continuous) processes and also with potentially temperature-sensitive glass substrates such as chemically-strengthened (i.e., ion-exchanged) glass substrates. Coatings made by the disclosed method can provide high hardness and low coefficient of friction (COF), which can improve the durability and lifetime, particularly with respect to scratch-resistance, of the coated glass.

Additional features and advantages of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
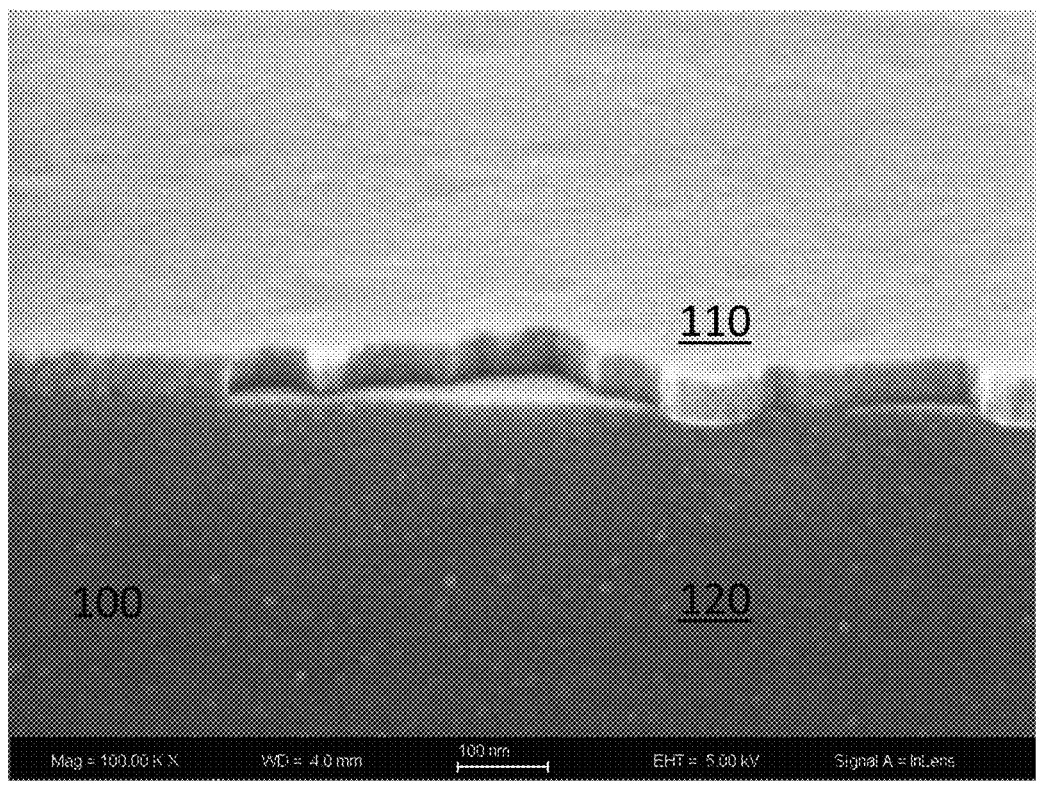
FIG. 1 is a scanning electron microscope (SEM) micrograph of a zirconia-coated glass substrate.

Reference will now be made in greater detail to various embodiments of the subject matter of the present disclosure, some embodiments of which are illustrated in the accompanying drawings. The same reference numerals will be used throughout the drawings to refer to the same or similar parts.

A sol-gel method for forming a protected glass article includes providing a solution comprising at least one of a metal salt, an organo-metallic compound, or a combination thereof in a polar aprotic solvent, depositing the solution onto a glass substrate to form a coating on the substrate, and annealing the coating. In embodiments, the solution may further comprise an insoluble species. Such a mixture (of soluble components dissolved in a solvent and insoluble components dispersed in the solvent) may be referred to herein as a solution.

In embodiments, a solution comprising a first metal salt or a first metal compound (e.g., a zirconium precursor) can be deposited, annealed and optionally crystallized to form a first metal oxide (e.g., zirconia) coating. The sequential acts of deposition and annealing can be repeated to form a or titania-based coatings is titanium isopropoxide (Ti(OCH$(CH_3)_2)_4$).

Using the disclosed method, modified glass surfaces comprising an oxide coating, such as a zirconia- or titania-based coating, for example, can exhibit desired attributes including scratch resistance and durability. Such surfaces can also be easy to clean.

The solvent can include a polar, aprotic solvent. Polar aprotic solvents may be described as solvents that share an ion dissolving power with protic solvents but which lack an acidic hydrogen. Such solvents generally have intermediate dielectric constants and polarity. Aprotic solvents do not display hydrogen bonding, but are able to stabilize ions.

Physical properties of example polar aprotic solvents, including boiling point (bp), dielectric constant ($\in$), density ($\rho$) and dipole moment (dm) at 25° C. are summarized in Table 1.

TABLE 1

Properties of Polar Aprotic Solvents

| name | formula | bp | $\in$ | density | dm |
|---|---|---|---|---|---|
| Dichloromethane (DCM) | $CH_2Cl_2$ | 40° C. | 9.1 | 1.3266 g/ml | 1.60 D |
| Tetrahydrofuran (THF) | $-CH_2-CH_2-O-CH_2-CH_2-$ | 66° C. | 7.5 | 0.886 g/ml | 1.75 D |
| Ethyl acetate | $CH_3-C(=O)-O-CH_2-CH_3$ | 77° C. | 6.0 | 0.894 g/ml | 1.78 D |
| Acetone | $CH_3-C(=O)-CH_3$ | 56° C. | 21 | 0.786 g/ml | 2.88 D |
| Dimethylformamide (DMF) | $H-C(=O)N(CH_3)_2$ | 153° C. | 38 | 0.944 g/ml | 3.82 D |
| Acetonitrile (MeCN) | $CH_3-C\equiv N$ | 82° C. | 37 | 0.786 g/ml | 3.92 D |
| Dimethyl sulfoxide (DMSO) | $CH_3-S(=O)-CH_3$ | 189° C. | 47 | 1.092 g/ml | 3.96 D | multilayer coating. In an example method, a zirconia coating can be formed from a clear, viscous, 1.9M solution of zirconium oxychloride dissolved in dimethylformamide (DMF).

In embodiments, the solution can include two or more metal salts or organo-metallic compounds, i.e., comprising different metals. By way of example, a solution comprising a first metal salt or a first metal compound can be mixed in a desired ratio (e.g., under nitrogen) with a solution comprising a second metal salt or a second metal compound. The composite (combined) solution, which may include a zirconium precursor and a titanium precursor, for example, can be deposited, annealed and optionally crystallized to form a composite metal oxide (e.g., zirconia-titania) coating. In an example method, a 1.8M solution of zirconium oxychloride dissolved in DMF is combined with a 0.25M solution of nickel acetylacetonate dissolved in DMF.

In embodiments, the solution includes a metal salt or an organo-metallic compound as a precursor material. Such precursor materials may include chlorides, nitrates, acetylacetonates or alkoxides of various metals such as aluminum, zirconium, titanium, nickel, zinc, yttrium, scandium as well as combinations thereof. Example metal compounds used to form alumina or alumina-based coatings include aluminum chloride. Example metal compounds used to form zirconia or zirconia-based coatings include zirconium oxychloride octahydrate ($Zr(OCl_2).H_2O$) and zirconium acetylacetonate ($Zr(CH_3COCHCOCH_3)_4$). In embodiments, zirconia-based coatings include yttrium stabilized zirconia and scandium stabilized zirconia. Yttrium stabilized zirconia coatings can comprise up to 10 mol. % yttrium. Scandium stabilized zirconia coatings can comprise up to 10 mol. % scandium. An example metal compound used to form titania In embodiments, a solution concentration can range from 0.05 to 2 molar (e.g., 0.05, 0.1, 0.25, 0.5, 1, 1.5, 1.6, 1.7, 1.8, 1.9 or 2M, including ranges between any two of the foregoing values). As used herein, the solution concentration, expressed as moles solute/liter solvent (i.e., molarity) can be used to define the amount of soluble metal salt or organo-metallic compound used to form the solution. Dense, inorganic coatings can be formed from solutions having a concentration from 0.5 to ~1.9M.

In embodiments, the solution can further include an additive, which can introduce a tribological, optical or other functionality to the coating. Example additives include nanoscale particles such as graphene particles and metal particles such as nickel particles, which can enhance or otherwise control hardness, coefficient of friction and optical scattering, for example. In embodiments, the additive may be soluble or highly-dispersible in the solvent. Further example additives (typically in the form of powders or fine particles) include diamond, Bucky balls, graphene, single wall carbon nanotubes, and multi-wall carbon nanotubes Particulate additives can be nanoscale or larger in size. Example particulate additives can have an average particle size of 10, 20, 50, 100, 200, 500, 1000, 2000 or 5000 nm, including ranges between any two of the foregoing values. While the amount of a particulate additive incorporated into the solution can be selected by a skilled artisan, example solutions include 0.5 to 5 mg solid (particulate) additive/ml solution (e.g., 0.5, 1, 1.5, 2, 2.5, 3, 3.5, 4 or 5 mg/ml, including ranges between any two of the foregoing values). A coating (such as a zirconia coating or a zirconia-titania coating) may comprise 0 to 10 wt. % additive, e.g., 0, 0.1, 0.2, 0.5, 1, 2, 5 or 10 wt. %, including ranges between any two of the foregoing values.

A particulate additive may be dispersed throughout the coating. In embodiments, the distribution of additive particles may be homogeneous. In embodiments, the particles may be concentrated at the surface of the coating or at the coating-substrate interface.

Particles of graphene, which are inherently two-dimensional, may be randomly-oriented within the coating. Alternatively, graphene platelets may be arranged substantially parallel to, perpendicular to, or at oblique angles to the substrate.

In embodiments, the solution is formed without the addition of water (e.g., as a hydrolysis agent) and/or without the addition of an acid or a base (e.g., as a catalyst). In embodiments, the solution is stable and may have a shelf-life of days, weeks, or even months.

The deposition may include spin-coating, dip-coating, spray-coating, tape-casting, ink jet, slot dye coating, misting, stamping, or washing the substrate in the solution. Formation of a coating by deposition of the solution onto the substrate can performed in a single deposition step or via a multilayer deposition process. In a spin-coating method, for example, a solution can be deposited onto a glass substrate rotating at 1000 to 5000 rpm (e.g., 1000, 2000, 3000, 4000 or 5000 rpm).

In embodiments the coating may cover all or substantially all of a surface of the glass substrate. Alternatively, the coating may be patterned to cover a portion of the glass substrate. Patterning may be done by selectively masking a region of the glass substrate during the deposition, such as with blocking tape or photoresist.

The glass substrate itself may be provided using a variety of different processes. For instance, example glass substrate forming methods include float processes and down-draw processes such as fusion draw and slot draw.

In the float glass method, a sheet of glass that may be characterized by smooth surfaces and uniform thickness is made by floating molten glass on a bed of molten metal, typically tin. In an example process, molten glass that is fed onto the surface of the molten tin bed forms a floating ribbon. As the glass ribbon flows along the tin bath, the temperature is gradually decreased until a solid glass sheet can be lifted from the tin onto rollers. Once off the bath, the glass sheet can be cooled further and annealed to reduce internal stress.

Down-draw processes produce glass sheets having a uniform thickness that possess surfaces that are relatively pristine. Because the strength of the glass surface is controlled by the amount and size of surface flaws, a pristine surface that has had minimal contact has a higher initial strength. When this high strength glass is then chemically-strengthened, the resultant strength can be higher than that of a surface that has been a lapped and polished. Down-drawn glass may be drawn to a thickness of less than about 2 mm. In addition, down drawn glass has a flat, smooth surface that can be used in its final application without costly grinding and polishing.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, because the two glass films flowing over the channel fuse together, neither outside surface of the resulting glass sheet comes in contact with any part of the apparatus. Thus, the surface properties of the fusion drawn glass sheet are not affected by such contact.

The slot draw method is distinct from the fusion draw method. Here the molten raw material glass is provided to a drawing tank. The bottom of the drawing tank has an open slot with a nozzle that extends the length of the slot. The molten glass flows through the slot/nozzle and is drawn downward as a continuous sheet and into an annealing region. The slot draw process can provide a thinner sheet than the fusion draw process because only a single sheet is drawn through the slot, rather than two sheets being fused together.

The chemically-strengthened glass substrate, in some embodiments, may be batched with 0-2 mol. % of at least one fining agent selected from a group that includes $Na_2SO_4$, NaCl, NaF, NaBr, $K_2SO_4$, KCl, KF, KBr, and $SnO_2$.

Once formed, glass substrates may be chemically-strengthened by an ion exchange process. In this process, typically by immersion of the glass substrate into a molten salt bath for a predetermined period of time, ions at or near the surface of the glass are exchanged for larger metal ions from the salt bath. In one embodiment, the temperature of the molten salt bath is about 430° C. and the predetermined time period is about eight hours. The incorporation of the larger ions into the glass strengthens the substrate by creating a compressive stress in a near surface region. A corresponding tensile stress is induced within a central region of the glass to balance the compressive stress.

In one example embodiment, sodium ions in the chemically-strengthened glass can be replaced by potassium ions from the molten bath, though other alkali metal ions having larger atomic radii, such as rubidium or cesium, can replace smaller alkali metal ions in the glass. According to particular embodiments, smaller alkali metal ions in the glass can be replaced by $Ag^+$ ions. Similarly, other alkali metal salts such as, but not limited to, sulfates, halides, and the like may be used in the ion exchange process.

The replacement of smaller ions by larger ions at a temperature below that at which the glass network can relax produces a distribution of ions across the surface of the glass that results in a stress profile. The larger volume of the incoming ion produces a compressive stress (CS) on the surface and tension (central tension, or CT) in the center of the glass. The compressive stress is related to the central tension by the following relationship:

$$CS = CT\left(\frac{t - 2DOL}{DOL}\right)$$

where t is the total thickness of the glass sheet and DOL is the depth of exchange, also referred to as depth of layer.

In one embodiment, a chemically-strengthened glass sheet can have a surface compressive stress of at least 300 MPa, e.g., at least 400, 450, 500, 550, 600, 650, 700, 750 or 800 MPa, a depth of layer at least about 20 μm (e.g., at least about 20, 25, 30, 35, 40, 45, or 50 μm) and/or a central tension greater than 40 MPa (e.g., greater than 40, 45, or 50 MPa) but less than 100 MPa (e.g., less than 100, 95, 90, 85, 80, 75, 70, 65, 60, or 55 MPa).

Example ion-exchangeable glasses that may be used as the glass substrate are alkali aluminosilicate glasses or alkali aluminoborosilicate glasses, though other glass compositions are contemplated. As used herein, "ion exchangeable" means that a glass is capable of exchanging cations located at or near the surface of the glass with cations of the same valence that are either larger or smaller in size. One example glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass substrate includes at least 6 wt. % aluminum oxide. In a further embodiment, a glass substrate includes one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass substrate can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the glass substrate comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\sum \text{modifiers}} > 1,$$

where in the ratio the components are expressed in mol. % and the modifiers are alkali metal oxides. This glass, in particular embodiments, comprises, consists essentially of, or consists of: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\sum \text{modifiers}} > 1.$$

In another embodiment, an alkali aluminosilicate glass comprises, consists essentially of, or consists of: 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

In yet another embodiment, an alkali aluminosilicate glass substrate comprises, consists essentially of, or consists of: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; wherein 12 mol. % $\leq Li_2O+Na_2O+K_2O \leq 20$ mol. % and 0 mol. % $\leq MgO+CaO \leq 10$ mol. %.

In still another embodiment, an alkali aluminosilicate glass comprises, consists essentially of, or consists of: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO > 10$ mol. %; 5 mol. % $\leq MgO+CaO+SrO \leq 8$ mol. %; $(Na_2O+B_2O_3)-Al_2O_3 \leq 2$ mol. %; 2 mol. % $\leq Na_2O-Al_2O_3 \leq 6$ mol. %; and 4 mol. % $\leq (Na_2O+K_2O)-Al_2O_3 \leq 10$ mol. %. Example alkaline earth aluminoborosilicate glasses include Eagle XG® glass, which is marketed by Corning, Incorporated.

In addition to the foregoing, the glass substrate may comprise a soda-lime glass. The glass substrate can have a thickness ranging from about 100 microns to 5 mm. Example substrate thicknesses range from 100 microns to 500 microns, e.g., 100, 200, 300, 400 or 500 microns. Further example substrate thicknesses range from 500 microns to 1000 microns, e.g., 500, 600, 700, 800, 900 or 1000 microns. The glass substrate may have a thickness greater than 1 mm, e.g., about 2, 3, 4, or 5 mm.

The deposited coating may be annealed at a temperature and for a period of time. The heat source for annealing can be a hot-plate, tube furnace, oven, or a localized heat source such as a flame (torch), laser, heat gun, or flash lamp furnace such as a rapid thermal annealer (RTA).

An annealing temperature may range from 150 to 450° C., e.g., 150, 200, 250, 300, 350, 400 or 450° C. Annealing may be performed in a controlled environment (e.g., air, oxygen, nitrogen, argon, forming gas, etc.). An annealing time may range from 0.5 to 30 min, e.g., 0.5, 1, 2, 5, 10, 15, 20 or 30 min. For a coating comprising multiple layers, an annealing step may be used between the deposition of successive layers. Annealing may thermally decompose the precursor to form an inorganic coating. Annealing may also densify the coating.

After deposition of single (or multiple) layers, the coating may be crystallized. Crystallization may be performed in a controlled environment (e.g., air, oxygen, nitrogen, argon, forming gas, etc.). A crystallization temperature may range from 150° C. to the softening point of the glass substrate. For example, a crystallization temperature may range from 150 to 700° C., e.g., 150, 200, 250, 300, 350, 400, 450, 500, 550, 600, 650 or 700° C. A crystallization time may range from 1 to 300 min, e.g., 1, 2, 5, 10, 15, 20, 30, 60, 90, 120, 150, 180, 210, 240 or 300 min. In embodiments, annealing (densification) and crystallization may occur in a single heating step.

An optional additional thermal treatment may be used to further consolidate the post-annealed (post-crystallized) coating. An example thermal treatment involves heating the coated glass substrate in vacuum at a relatively low temperature over the range of 80° C. to 120° C. (e.g., 80, 90, 100, 110 or 120° C., including ranges between any two of the foregoing values) for 1, 2, 4, 6 or 8 hrs. The additional thermal treatment may beneficially decrease the coefficient of friction of the coating.

As with annealing, the heat source for crystallizing and for providing an additional thermal treatment can be a hot-plate, tube furnace or oven, or a localized heat source such as a flame (torch), laser, heat gun, or flash lamp furnace such as a rapid thermal annealer (RTA). A localized heat source can heat the coating without substantially heating the underlying glass substrate.

A coating, such as an aluminum oxide coating or a zirconium oxide coating, may be amorphous or crystalline. The coating may be dense or porous. The coating may be compositionally homogeneous or non-homogeneous. The coating may comprise a second phase. As noted above, the coating may comprise an additive such as particles of graphene, which were added to the solution used to form the coating. In embodiments, the coating comprises particles that are formed in situ during thermal treatment of the coating. For instance, a zirconia ($ZrO_2$) coating derived from a solution of zirconium oxychloride octahydrate in dimethylformamide (DMF) may include regions rich in elemental carbon and/or chlorine. Carbon may be formed through incomplete pyrolysis of the solvent. Chlorine may be formed through incomplete pyrolysis of the zirconium salt. These residual deposits are typically less than 1 wt. % of the total mass of the coating. Such in situ deposits, if present, may be intra-granular, inter-granular (i.e., located along grain boundaries) or localized within pores of a partially-dense coating. X-ray photoelectron spectroscopy (XPS) data shows an increased concentration of surface carbon in the coating following a post-anneal heat treatment in vacuum at 100° C. for 8 hr.

A glass article comprises a glass substrate, an inorganic coating selected from the group consisting of a zirconia coating, a titania coating and a zirconia-titania coating disposed over at least a portion of a major surface of the glass substrate, and particles of an additive dispersed throughout the coating.

A scratch-resistant glass article 100 comprising an inorganic layer 110 formed over a glass substrate 120 is shown in FIG. 1.

EXAMPLES

Example 1

Zirconia ($ZrO_2$) and titania ($TiO_2$) coatings were prepared by spin-coating respective solutions onto glass substrates. For zirconia, a 1.9M solution of zirconium oxychloride octahydrate in DMF was used. For titania, a 1.6M solution (1:1 vol. %) of titanium isopropoxide in DMF was used. Both solutions were prepared under nitrogen. Coatings were formed by spin-coating the solutions onto a substrate at 4000 rpm for 30 sec. Annealing and crystallization of the as-deposited coatings was done at 475° C. for 5 min.

Figure 2:
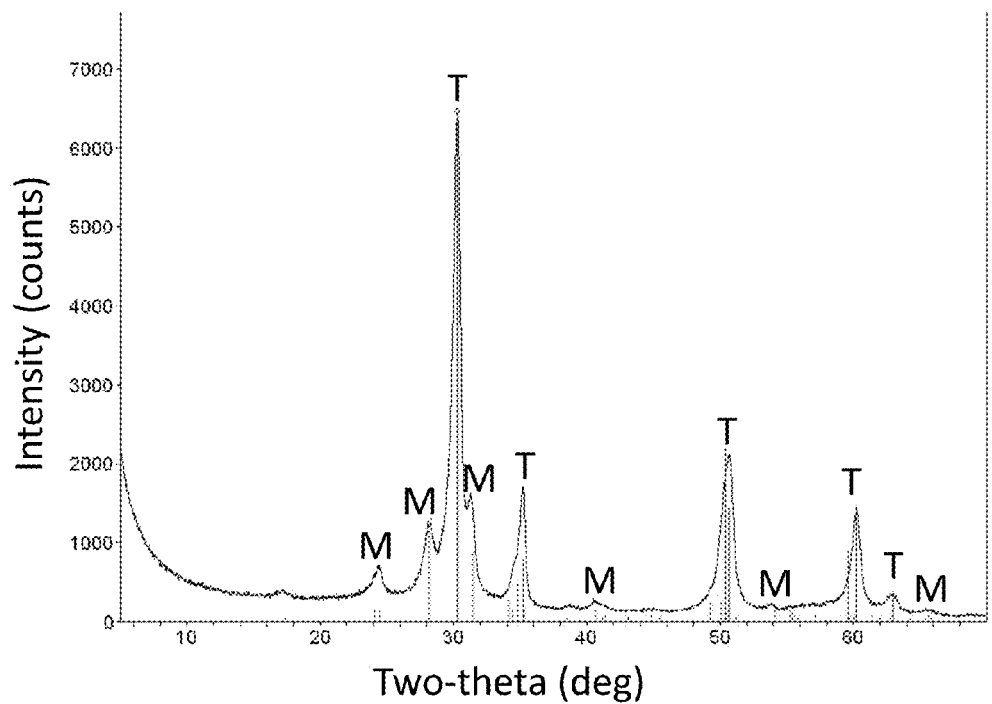
FIG. 2 is an x-ray diffraction scan of zirconia-coated glass substrates.
Figure 3:
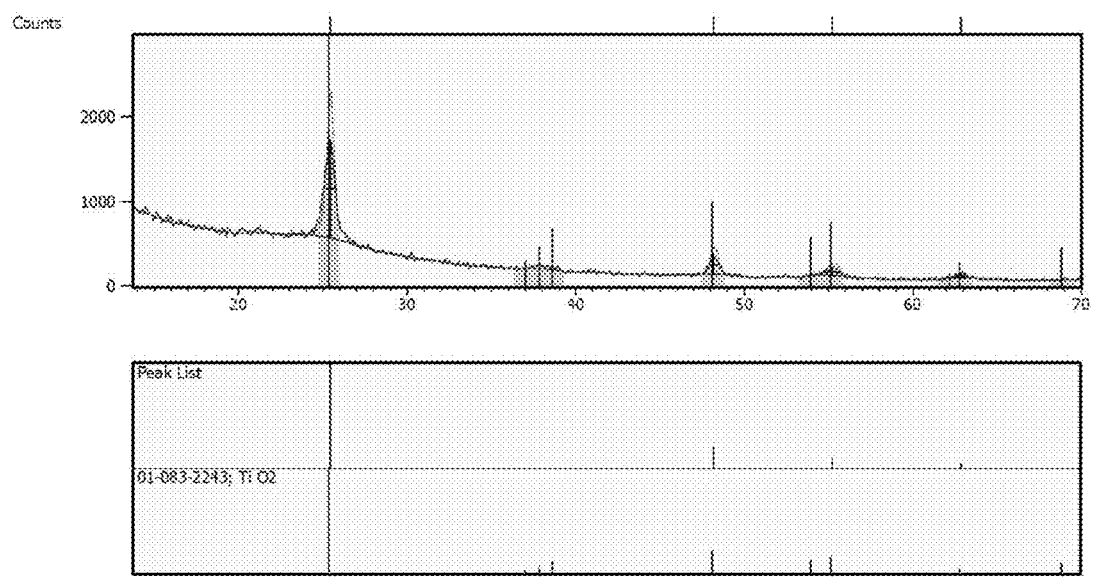
FIG. 3 is an x-ray diffraction scan of titania-coated glass substrates.

As shown in the x-ray diffraction data in FIG. 2, the zirconia coating is primarily tetragonal (T) zirconia, though reflections consistent with monoclinic (M) zirconia are also observed. The x-ray data for the titania coating (FIG. 3) index to the anatase polymorph of titanium oxide.

Example 2

Figure 4:
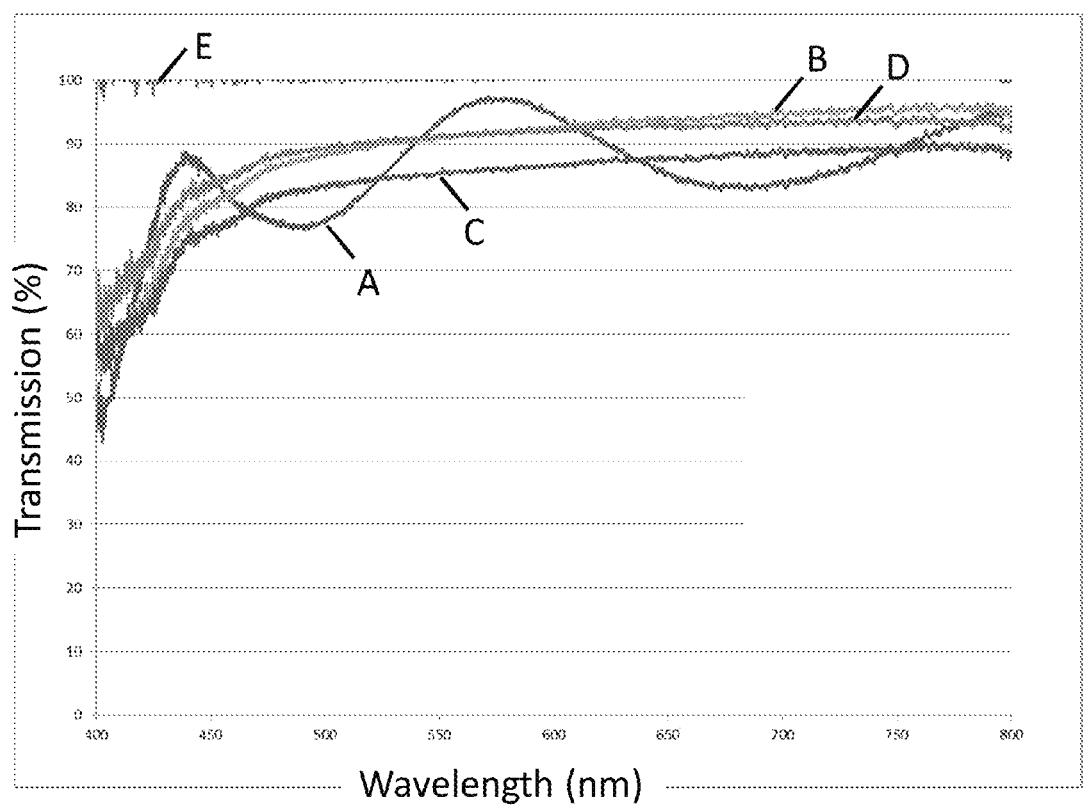
FIG. 4 is a plot of optical transmission versus wavelength for zirconia-based coatings on Eagle XG® glass according to various embodiments.

Optical transmission spectra for zirconia coatings are shown in FIG. 4. The examples include (A) zirconia, (B) zirconia doped with graphene, (C) zirconia doped with nickel, and (D) zirconia doped with carbon nanotubes. The transmission spectrum of an uncoated glass substrate (E) is shown for reference.

The zirconia coating was formed from a 1.9M solution of zirconium oxychloride octahydrate in DMF. For the graphene-doped and carbon nanotube-doped coatings, from 0.1 mg/ml to 1.6 mg/ml of graphene or single-walled carbon nanotube (SWCNT) particles were added to the zirconium oxychloride octahydrate solution prior to spin-coating. For the zirconia doped with nickel, a 1:1 volume ratio solution was prepared comprising zirconium oxychloride octahydrate in DMF (1.9M) and nickel acetylacetonate in DMF (0.25M).

Transmission through the uncoated glass substrate was nearly 100%. The zirconia coating, with opposing air and glass boundaries, forms an etalon. The interference manifests in rapid wavelength oscillations that produces colored fringes in the sample. The incorporation of nanoparticle graphene, SWCNT or nickel surprisingly destroys the coherent reflections obtained in the zirconia-only coating, which minimizes the appearance of color in the interference fringes. A majority of the excess transmission loss (14%–4%=10%) is due to high Fresnel reflections in the interface between zirconia and air. Overall the coatings have good optical quality from 440 nm to 780 nm, which is suitable for most display applications.

Example 3

Figure 5:
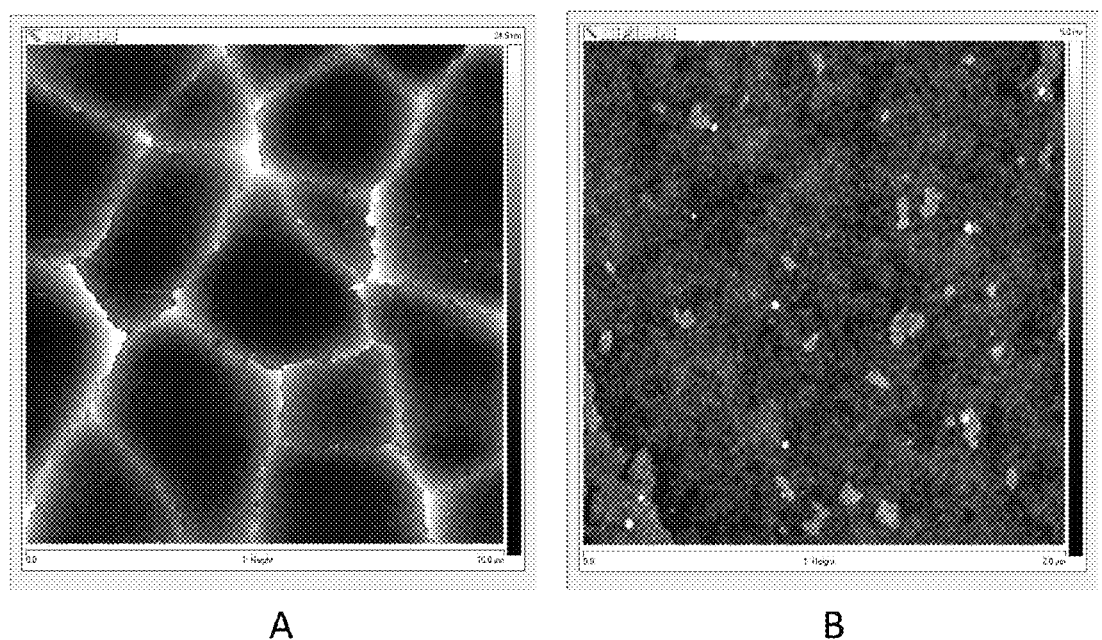
FIGS. 5A and 5B are atomic force microscope (AFM) images of zirconia coatings according to various embodiments.

Atomic force microscopy (AFM) data are shown in FIG. 5 for two different zirconia coatings. FIG. 5A shows a 10×10 $micron^2$ grid for a zirconia coating formed from a 1.9M solution of zirconium oxychloride octahydrate in DMF. FIG. 5B shows a 2×2 $micron^2$ grid for a graphene-doped (1.6 mg/ml) zirconia coating formed from a 0.95M solution of zirconium oxychloride octahydrate in DMF. Additional solvent was added to the graphene-doped solution to decrease the molarity. Post-deposition, both samples were annealed and crystallized at 450° C. for 15 min. The coefficient of friction of the graphene-doped coating was less than the coefficient of friction of the zirconia-only coating.

Example 4

Figure 6:
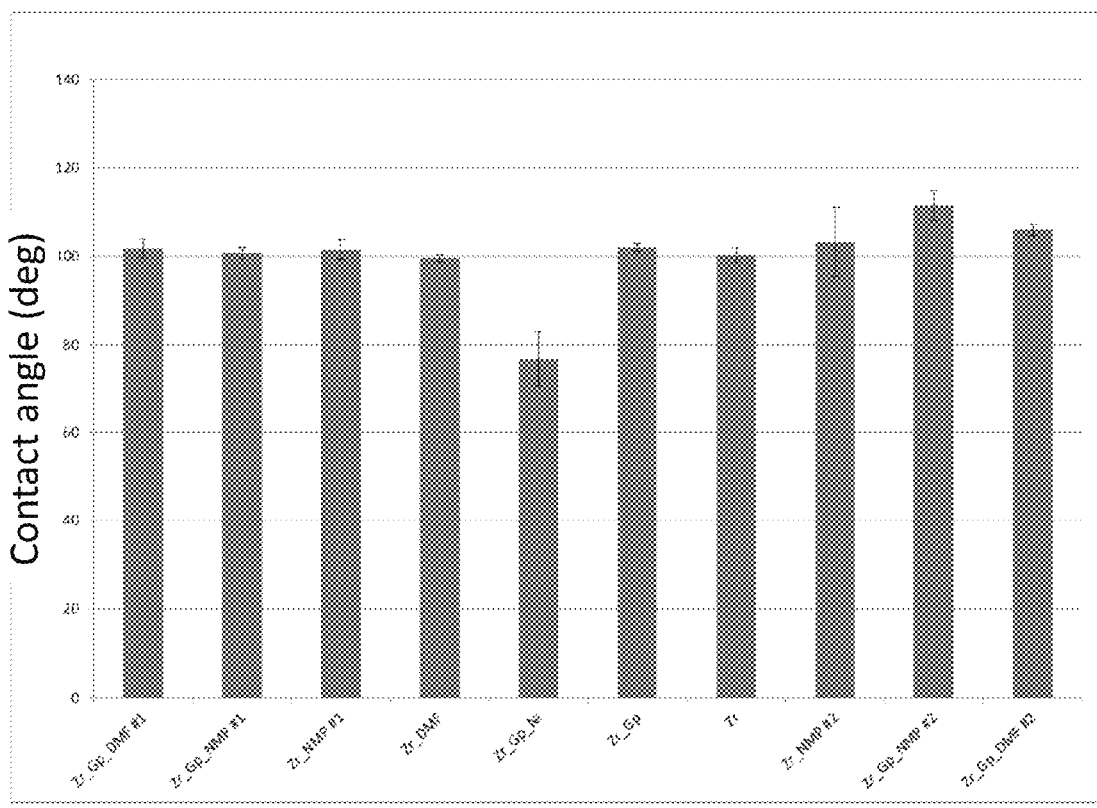
FIG. 6 is a graph showing the contact angle for example zirconia-based coatings.

Contact angle measurements for doped and un-doped zirconia coatings are summarized in FIG. 6. A starting solution of 1.9M zirconium oxychloride octahydrate in DMF was used to form the coatings. Graphene dispersed in DMF (1.6 mg/ml) was added to select solutions to form graphene-doped coatings. A solution of nickel acetylacetonate (AcAc) in DMF was used to form nickel-doped coatings. The concentration of certain solutions was intentionally diluted via excess solvent addition. If included, one volume equivalent of dispersed or dissolved dopant and/or additional solvent was used to form the final solution. Table 2 summarizes the samples included in FIG. 6, which includes repeat samples (#2).

After spin-coating, each sample was annealed/crystallized at 450° C. for 15 min. Each sample was additionally treated with a post-anneal vacuum oven heat treatment (200° C. for 8 hr).

TABLE 2

| Ex. # | Sample ID | Zirconia precursor | Dopant | Additional solvent |
|---|---|---|---|---|
| 1 | Zr_Gp_DMF #1, #2 | 1.9M in DMF | 1 part graphene in DMF | 1 part DMF |
| 2 | Zr_Gp_NMP #1, #2 | 1.9M in DMF | 1 part graphene in DMF | 1 part NMP |
| 3 | Zr_NMP #1, #2 | 1.9M in DMF |  | 1 part NMP |
| 4 | Zr_DMF | 1.9M in DMF |  | 1 part DMF |
| 5 | Zr_Gp_Ni | 1.9M in DMF | 1 part graphene in DMF + 1 part Ni (AcAc) in DMF |  |
| 6 | Zr_Gp | 1.9M in DMF | 1 part graphene in DMF |  |
| 7 | Zr | 1.9M in DMF |  | 1 part DMF |

Example 5

Figure 7:
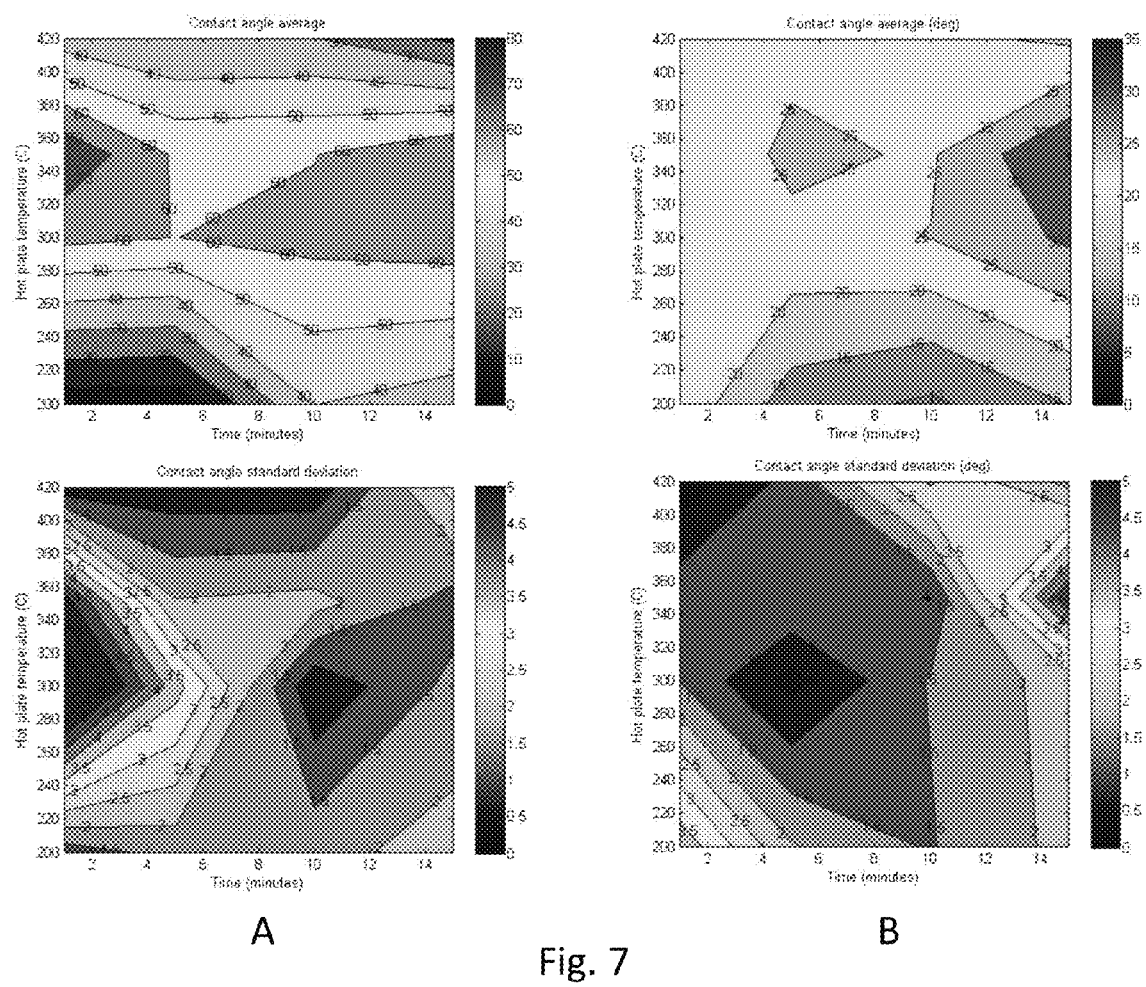
FIGS. 7A and 7B are topographical maps of contact angle and contact angle standard deviation for example zirconia coatings on Eagle XG® glass.

Two-dimensional plots of contact angle (in degrees) and contact angle standard deviation versus annealing temperature and time for zirconia coatings are shown in FIG. 7. The data in FIG. 7a correspond to coatings derived from a 1.9M solution of zirconium oxychloride octahydrate in DMF, and the data in FIG. 7b correspond to a coating derived from a 0.9M solution of zirconium oxychloride octahydrate in DMF.

Following annealing, all samples were additionally heat treated in vacuum at 100-200° C. for 8 hours.

Samples annealed at 200° C. for 1 minute and 5 minutes did not crystallize and delaminated from the surface. The samples annealed at 200° C. for 10 minutes and 15 minutes, however, were robust and stable.

Figure 8:
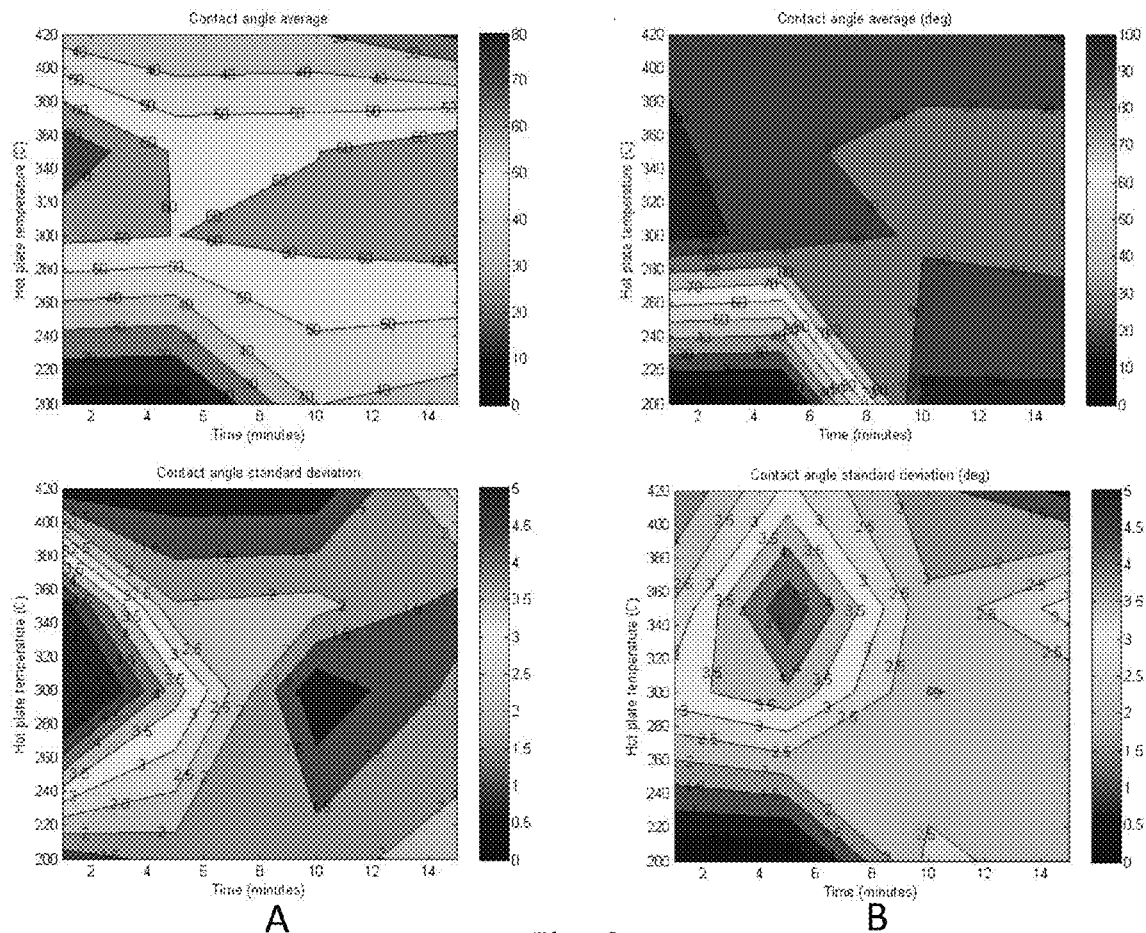
FIGS. 8A and 8B are topographical maps of contact angle and contact angle standard deviation for example zirconia coatings on Eagle XG® glass.
Figure 9:
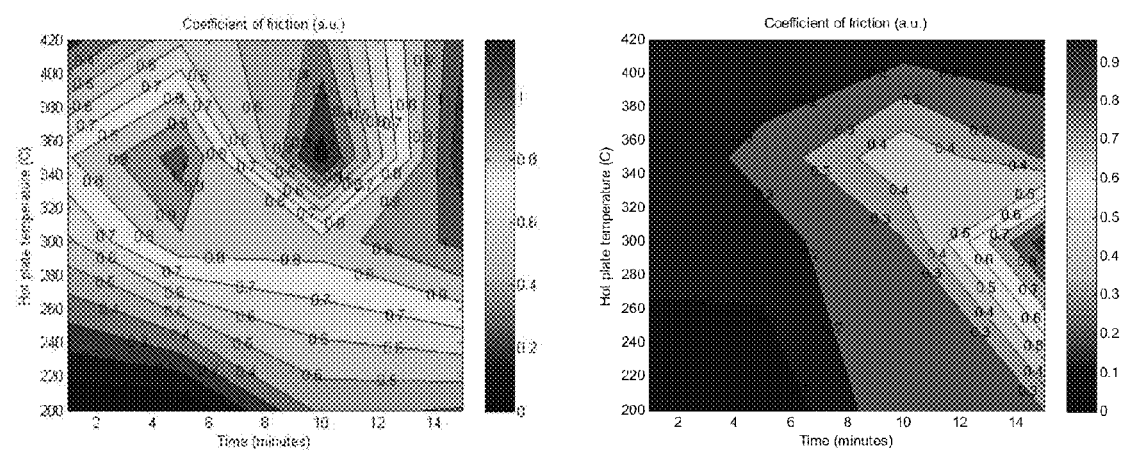
FIGS. 9A and 9B are topographical maps of coefficient of friction for example zirconia coatings.

Turning to FIG. 8, shown are two-dimensional plots of contact angle (in degrees) and contact angle standard deviation versus annealing temperature and time both prior to a post-anneal heat treatment (FIG. 8a), following a post-anneal heat treatment (FIG. 8b). The data in FIG. 8 correspond to coatings derived from a 1.9M solution of zirconium oxychloride octahydrate in DMF. Samples annealed at 200° C. for 1 minute and 5 minutes did not crystallize and detached from the glass surface.

The post-anneal heat treatment, which was conducted at 200° C. for 8 hr in a vacuum oven, dramatically impacts the hydrophobicity of the zirconia coatings, i.e., the contact angle increases as a result of the additional heating cycle, which results in a concomitant decrease in the coefficient of friction of these coatings.

The data in FIGS. 7 and 8 shows that a wide range of contact angles can be achieved using the same precursor by appropriately selecting the thermal processing, including treatment time and temperature.

Example 6

Coefficient of friction (COF) data are shown graphically in FIGS. 9-13. The coefficient of friction measurement uses a normal load of 30 N, which is applied to the sample surface over a 5 mm length at a scratch rate of 1 mm/s. The data in FIG. 9 correspond to zirconia coatings derived from a 1.9M solution of zirconium oxychloride octahydrate in DMF. Data are plotted as a function of anneal time and anneal temperature both prior to a post-anneal heat treatment (FIG. 9a), and following a post-anneal heat treatment at 200° C. for 8 hr in a vacuum (FIG. 9b). It is clear with reference to FIG. 9 that a post-anneal heating step in vacuum greatly improves the performance from the point of view of the coefficient of friction.

Figure 10:
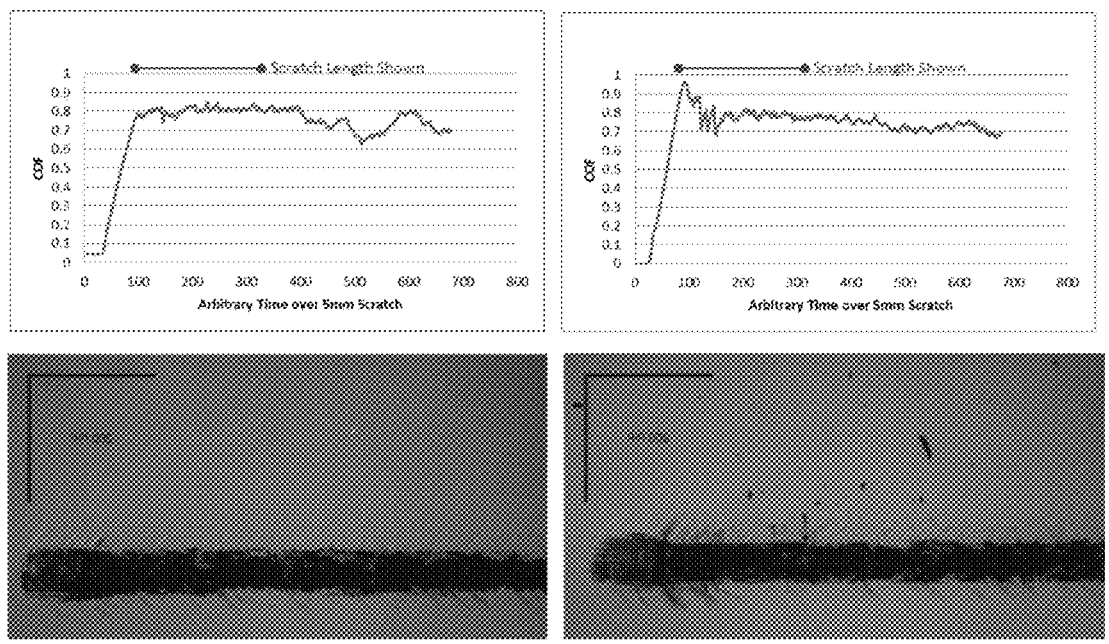
FIG. 10 is a plot showing coefficient of friction measurements on un-coated on Eagle XG® glass substrates (top) and a photomicrograph of a corresponding scratch (bottom)
Figure 11:
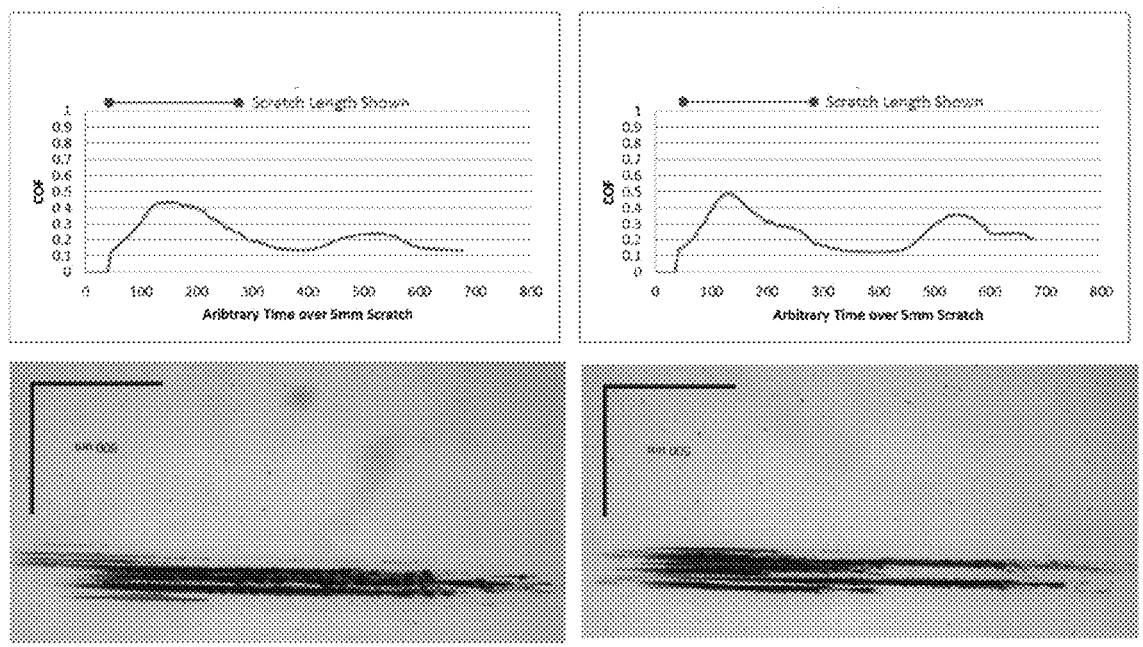
FIG. 11 is a plot showing coefficient of friction measurements on un-coated Gorilla® glass substrates (top) and a photomicrograph of a corresponding scratch (bottom)

Details of the coefficient of friction data for selected samples are shown in FIGS. 10-13. Baseline data for an uncoated, comparative display glass sample are shown in FIG. 10. The coefficient of friction for the bare display glass is about 0.8. Data for an uncoated, comparative ion-exchanged glass substrate (compressive stress of 740 MPa and depth of layer of 46 microns) are shown in FIG. 11. The coefficient of friction for the bare ion-exchanged glass is about 0.3-0.4. FIG. 10 and FIG. 11 include repeat measurements showing the COF data trace and a corresponding optical micrograph of the scratch.

Figure 12:
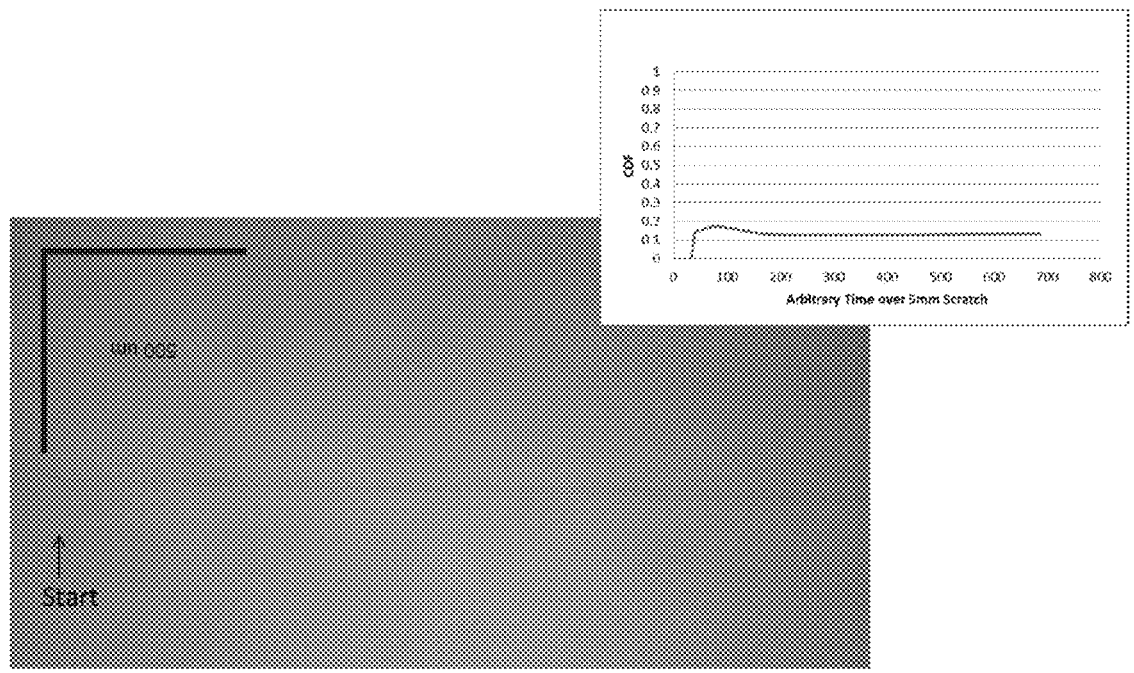
FIG. 12 is a plot showing coefficient of friction measurements on zirconia-coated Eagle XG® glass substrates.
Figure 13:
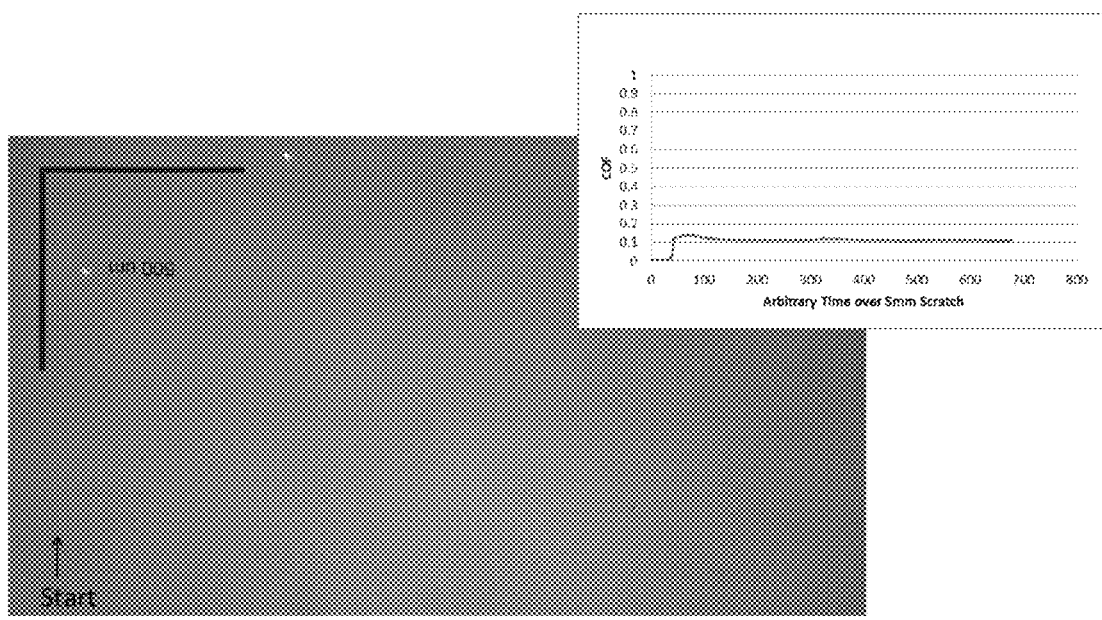
FIG. 13 is a plot showing coefficient of friction measurements on graphene doped, zirconia-coated Eagle XG® glass substrates.

Improvement in the coefficient of friction data are seen with reference to FIGS. 12 and 13. The data in FIG. 12 are for a zirconia-coated display glass substrate (Example 7 in Table 2), while the data in FIG. 13 are for a graphene-doped, zirconia-coated display glass substrate (Example 1 in Table 2). The coefficient of friction for the zirconia-coated display glass is about 0.12-0.13, and the coefficient of friction for the graphene-doped zirconia-coated display glass is about 0.10-0.11.

Example 7

Ring-on-ring strength measurements of zirconia-coated (1.3M zirconium oxychloride in DMF) and aluminum-titanium oxynitride-coated ion-exchanged glass showed that by annealing and crystallizing at a maximum temperature of about 550° C., the incumbent strength of the ion-exchanged glass was un-affected by the coating. The annealed coatings were about 50 microns thick. The annealing was performed by exposure to a heat gun for about 2 min.

The disclosed methods are compatible with a variety of glass substrates, including chemically-strengthened glass substrates, and can be used to form hard, scratch-resistant, optically-clear hydrophobic coatings. In embodiments, the coating comprises a single thin film. In further embodiments, the coating comprises a composite of plural thin films.

The coatings disclosed herein can be used for a broad number of applications. In pharmaceutical packaging, for example, the coatings can be used on vials or vessels that would benefit from improved damage resistance, i.e., external protection from shatter inducing impacts. Further, the coatings can be used to provide protective internal surface coatings of pharmaceutical vials that are susceptible to chemical aging or erosion.

Other prospective applications include the use of the coatings to block ion exchange (chemical strengthening) in glass substrates over areas where such strengthening is not desired. In display glass, the coatings can be used to enhance edge strength, for example.

Particularly because the coatings can be cured at low temperature, the disclosed method is applicable to temperature-sensitive applications such as OLED displays, where scratch resistant coatings can be disposed on finished devices without compromising organic layers within the device.

As used herein, the singular forms "a," "an" and "the" include plural referents unless the context clearly dictates otherwise. Thus, for example, reference to a "polar aprotic solvent" includes examples having two or more such "polar aprotic solvents" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. Any recited single or multiple feature or aspect in any one claim can be combined or permuted with any other recited feature or aspect in any other claim or claims.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a solution comprising a metal salt and a polar aprotic solvent include embodiments where a solution consists of a metal salt and a polar aprotic solvent and embodiments where a solution consists essentially of a metal salt and a polar aprotic solvent.

It will be apparent to those skilled in the art that various modifications and variations can be made to the present invention without departing from the spirit and scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

We claim:

1. A method of coating a display glass substrate with a scratch resistant, optically transparent, graphene-doped zirconia coating, the method comprising:
    providing a first solution consisting of a zirconium metal salt, an organic-metallic zirconium compound, or a combination thereof in a first polar aprotic solvent;
    providing a second solution consisting of graphene nanoscale particles in a second polar aprotic solvent;
    combining the first solution and the second solution;
    depositing the combined solution onto the display glass substrate to form a coating on the display glass substrate;
    annealing the deposited coating at between 150° C. to 450° C. for between 0.5 to 30 minutes to form a post-annealed scratch resistant, optically transparent, graphene-doped zirconia coating; and
    thermally treating to further consolidate the post-annealed coating by heating the post-annealed coating at between 90° C. to 120° C. for between 1 to 8 hours;
    wherein the scratch resistant, optically transparent, graphene-doped zirconia coating reduces a kinetic coefficient of friction of the display glass substrate measured with a scratch rate of 1 mm/s from about 0.8 to about 0.10-0.11.

2. The method according to claim 1, wherein the first and second polar aprotic solvents are selected from the group consisting of dimethylformamide, tetrahydrofuran, ethyl acetate, acetone, dichloromethane, acetonitrile, dimethyl sulfoxide and n-methyl pyrrolidone.

3. The method according to claim 1, wherein the zirconium metal salt comprises zirconium oxychloride.

4. The method according to claim 1, wherein the zirconium metal salt comprises zirconium oxychloride and the first polar aprotic solvent comprises dimethylformamide.

5. The method according to claim 1, wherein the zirconium metal salt in the first polar aprotic solvent has a concentration of 0.05 to 2 M.

6. The method according to claim 1, further comprising adding semiconductor nanoparticles, metal nanoparticles or a combination thereof dispersed in the second polar aprotic solvent prior to the depositing.

7. The method according to claim 6, wherein the nanoparticles are in the form of nanotubes, nanowires, nanodots, or combinations thereof.

8. The method according to claim 1, wherein the depositing comprises spin-coating, dip-coating, spray-coating, tape-casting, ink jet, slot dye coating, misting, stamping, or washing the substrate in the solution.

9. The method according to claim 1, wherein the depositing comprises forming a patterned coating.

10. The method according to claim 1, further comprising crystallizing the coating after the annealing.

11. The method according to claim 1, further comprising crystallizing the coating during the annealing.

12. The method of claim 1, wherein the zirconium metal salt is zirconium oxychloride octahydrate.

13. The method of claim 1, further comprising providing additional polar aprotic solvent to the second solution to decrease the molarity of the second solution before combining the first and second solutions.

* * * * *